United States Patent

[11] 3,573,729

[72] Inventors John F. Gunn
West Newbury;
John A. Lombardi, Haverhill, Mass.
[21] Appl. No. 829,024
[22] Filed May 29, 1969
[45] Patented Apr. 6, 1971
[73] Assignee Bell Telephone Laboratories, Inc.
Murray Hill, Berkeley Heights, N.J.

[54] ERROR DETECTION IN MULTILEVEL TRANSMISSION
6 Claims, 5 Drawing Figs.

[52] U.S. Cl. .......... 340/146.1, 340/347
[51] Int. Cl. .......... H04b 1/66, G08c 25/00
[50] Field of Search .......... 340/146.1, 347

[56] References Cited
UNITED STATES PATENTS

| | | | |
|---|---|---|---|
| 3,061,814 | 10/1962 | Crater | 340/146.1 |
| 3,303,462 | 2/1967 | Dotter | 340/146.1 |
| 3,337,864 | 8/1967 | Lender | 340/146.1X |

*Primary Examiner*—Malcolm A. Morrison
*Assistant Examiner*—R. Stephen Dildine, Jr.
*Attorneys*—R. J. Guenther and E. W. Adams, Jr.

ABSTRACT: Error detection in multilevel partial response correlation code transmission is achieved by maintaining separate running sums of discrete sets of related pulses. Each sum is monitored for violation of particular constraints characteristic of the code and both error indicator and sum correction signals are generated.

INVENTORS J. F. GUNN
J. A. LOMBARDI
BY David P. Kelley
ATTORNEY

FIG. 3

| $B_n$ | $h_0$ | $h_1$ | $h_2$ | $h_3$ | $j_0$ | $j_1$ | $j_2$ | $j_3$ |
|---|---|---|---|---|---|---|---|---|
| 7 | 1 | 0 | 0 | 0 | 0 | 1 | 1 | 1 |
| 6 | 1 | 0 | 0 | 1 | 0 | 1 | 1 | 0 |
| 5 | 1 | 0 | 1 | 1 | 0 | 1 | 0 | 1 |
| 4 | 1 | 0 | 1 | 0 | 0 | 1 | 0 | 0 |
| 3 | 1 | 1 | 1 | 0 | 0 | 0 | 1 | 1 |
| 2 | 1 | 1 | 1 | 1 | 0 | 0 | 1 | 0 |
| 1 | 1 | 1 | 0 | 1 | 0 | 0 | 0 | 1 |
| 0 | 1 | 1 | 0 | 0 | 0 | 0 | 0 | 0 |
| -1 | 0 | 1 | 0 | 0 | 1 | 1 | 1 | 1 |
| -2 | 0 | 1 | 0 | 1 | 1 | 1 | 1 | 0 |
| -3 | 0 | 1 | 1 | 1 | 1 | 1 | 0 | 1 |
| -4 | 0 | 1 | 1 | 0 | 1 | 1 | 0 | 0 |
| -5 | 0 | 0 | 1 | 0 | 1 | 0 | 1 | 1 |
| -6 | 0 | 0 | 1 | 1 | 1 | 0 | 1 | 0 |
| -7 | 0 | 0 | 0 | 1 | 1 | 0 | 0 | 1 |

FIG. 4

| $S_n$ | $s_0$ | $s_1$ | $s_2$ | $s_3$ | |
|---|---|---|---|---|---|
| 7 | 0 | 1 | 1 | 1 | ERROR REGION |
| 6 | 0 | 1 | 1 | 0 | |
| 5 | 0 | 1 | 0 | 1 | |
| 4 | 0 | 1 | 0 | 0 | |
| 3 | 0 | 0 | 1 | 1 | ALLOWED REGION |
| 2 | 0 | 0 | 1 | 0 | |
| 1 | 0 | 0 | 0 | 1 | |
| 0 | 0 | 0 | 0 | 0 | |
| -1 | 1 | 1 | 1 | 1 | |
| -2 | 1 | 1 | 1 | 0 | |
| -3 | 1 | 1 | 0 | 1 | |
| -4 | 1 | 1 | 0 | 0 | |
| -5 | 1 | 0 | 1 | 1 | ERROR REGION |
| -6 | 1 | 0 | 1 | 0 | |
| -7 | 1 | 0 | 0 | 1 | |
| -8 | 1 | 0 | 0 | 0 | |

FIG. 5

| $s_{0-1}$ | E | $I_0$ | $I_1$ | $I_2$ | $I_3$ |
|---|---|---|---|---|---|
| 0 | 0 | 0 | 0 | 0 | 0 |
| 0 | 1 | 1 | 1 | 1 | 1 |
| 1 | 1 | 0 | 0 | 0 | 1 |
| 1 | 0 | 0 | 0 | 0 | 0 |

ERROR DETECTION IN MULTILEVEL TRANSMISSION

FIELD OF THE INVENTION

This invention relates to multilevel digital signal transmission and, more particularly, to error detection in partial response correlation code transmission.

BACKGROUND OF THE INVENTION

Partial response correlation codes utilizing more than two levels of pulse amplitude, by utilizing intersymbol interference in precisely prescribed amounts, make better use of available bandwidth through more efficient power spectral density shaping of the transmittal signal.

In error-detecting arrangements for systems utilizing various types of binary code transmission, the introduction of redundancies or other code pulses into the signal train at the transmitter is necessary in order to ascertain, at the receiver, whether or not errors have occurred in the transmission, Inasmuch as these error determining pulses carry no signal information, they necessarily cut down on the number of pulses available for signal information in a given bandwidth. Furthermore, additional, somewhat complex, apparatus is required both at the transmitter and receiver to handle the error-determining pulses.

On the other hand, consider a partial response correlation code wherein the $n$th transmitted pulse $B_n$ is given by $$B_n=A_n-_{n1x} \qquad (1)$$

where $A_n$ is the $n$th pulse prior to correlation and $x$ is an integer greater than one. From (1) it can be seen that each pulse $B_n$ is constrained by a previously occurring pulse. As a consequence, error detection can be realized by an arrangement for monitoring the transmitted pulse train for violations of the constraint, without resort to additional error-determining pulses.

Equation (1) also defines discrete sets of pulses, the pulses in each set being related to each other, but unrelated to all other pulses.

SUMMARY OF THE INVENTION

The apparatus of the present invention makes use of the correlation constraint to monitor the system for transmission errors and to provide an indication of the occurrence of errors. The error-monitoring arrangement may be placed at any point or points in the system and, as will be apparent hereafter, is capable of detecting error rates much greater than the allowable error rate. For example, in a system in which a 15-level signal is transmitted at 4.43 megabauds in a 2.52 megahertz band, a maximum error rate of $2.6\times10^7$ is considered desirable. The arrangement of the invention is capable of detecting nearly 100 percent of the errors occurring at a rate of $10^{13}$ per second, a detection rate greatly in excess of the maximum desirable error rate.

In an illustrative embodiment of the invention, the error detector comprises a converter to which the multilevel signal is applied. Where the detector is used at a regenerative repeater, this converter, which converts the multilevel signal to a binary signal, may be a part of the repeater itself. The output of the converter is applied as a four-bit parallel word to a register. From the register, under control of a clock, the binary digits are applied to a second converter, which recodes the word into binary form more suitable for the operations to follow. The output of the second converter is applied to a four-bit parallel adder which sequentially maintains a plurality of running sums depending upon the value of $x$ in equation (1). Thus all pulses in each discrete set are summed, but pulses in unrelated sets are not.

The output of the adder is monitored by an error monitor which registers an error and produces an output whenever the running sum exceeds the allowable limits. This monitor output is applied to a flip-flop where it is temporarily stored. The adder output is applied to a delay register and held until a clock pulse releases it after a one digit delay, at which time the next word in the sequence is being applied to the first four-bit parallel adder. The output of the delay register is applied to a second four-bit parallel adder. At the same time the signal stored in the flip-flop is fed to a correction signal generator and to an error gate circuit from which an error indication is given. The lowest digit of the output of the delay register is also applied to the correction signal generator to control the sign of the correction signal. The output of the correction signal generator is added to the output of the delay register in the second adder so that the output thereof, which is applied to a second delay register, is a corrected running sum. Thus if, for example, $B_n$ was an even-numbered digit at the start of the sequence, the running sum stored in the second delay register is now the even-numbered digit running sum, and the running sum stored in the first delay register is that of the next odd-numbered digit.

Upon occurrence of the next clock pulse, the signal stored in the second delay register is applied to the first parallel adder in the case where $x$ is 2, where the $B_{n+2}$ pulse is now applied, and the running sum is updated. Where $x$ is some other value than 2, additional delay increments are used so that the sum fed back to the first adder is added to the proper incoming pulse.

From the foregoing, it can be seen that two separate and independent running sums are maintained in the error monitor circuit, one for each set of pulses, the number of sets being determined by the value of $x$. This is in accord with the constraint given in equation (1), where it can be seen that adjacent multilevel digits are unrelated as are all digits between $A_n$ and $A_{n1x}$. Thus if $x$ is 4, the first and fifth digits are related, as are the second and sixth and third and seventh, but the first, second, third and fourth pulses are not related to each other. The error monitor detects violations of the code constraint and corrects each of the running sums independently, while simultaneously indicating whether or not an error has occurred.

The various features of the invention, as well as the details thereof, will be more fully understood from the following description, in conjunction with the accompanying drawings, in which:

FIG. 3 is a table of comparison of two possible codes used in the arrangement of the invention;

FIG. 4 is a chart of the running sum digit values, showing the error and no-error regions; and FIG. 5 is a truth table for the generation of error correction signals for the running sum.

DETAILED DESCRIPTION

Figure 1:
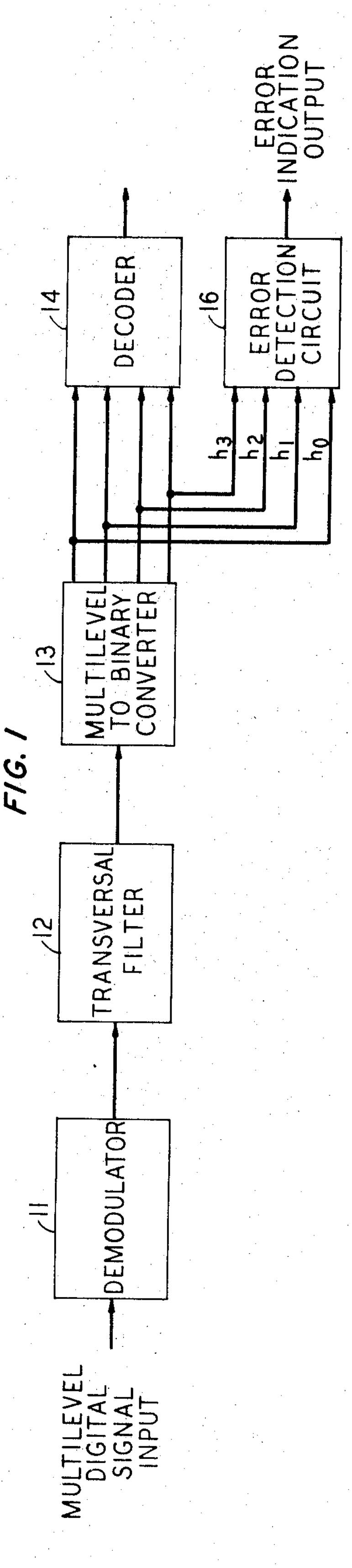
FIG. 1 is a block diagram of a portion of a terminal circuit of a transmission system utilizing the present invention.

Referring to FIG. 1, a portion of a terminal circuit for a multilevel digital carrier transmission system is shown in its relationship to the error detection system. While a carrier terminal circuit is shown, it is to be understood that the error detector may be used at numerous other points in the system or in other types of systems, and the arrangement here shown is by way of example only.

The incoming multilevel digital signal is applied to a demodulator 11 and transversal filter 12, the output of which is applied to a multilevel to binary converter 13 which converts the multilevel signal to, for example, a four-bit binary Gray code. The demodulator 11 and converter 13 may also be used to generate a "data ready" or clock signal upon completion of a four-bit word, comprising the bits $h_0$ through $h_3$. The output of converter 13 is applied to a decoder 14, and to the error detection circuit 16, which produces an output signal upon detection of an error.

Figure 2:
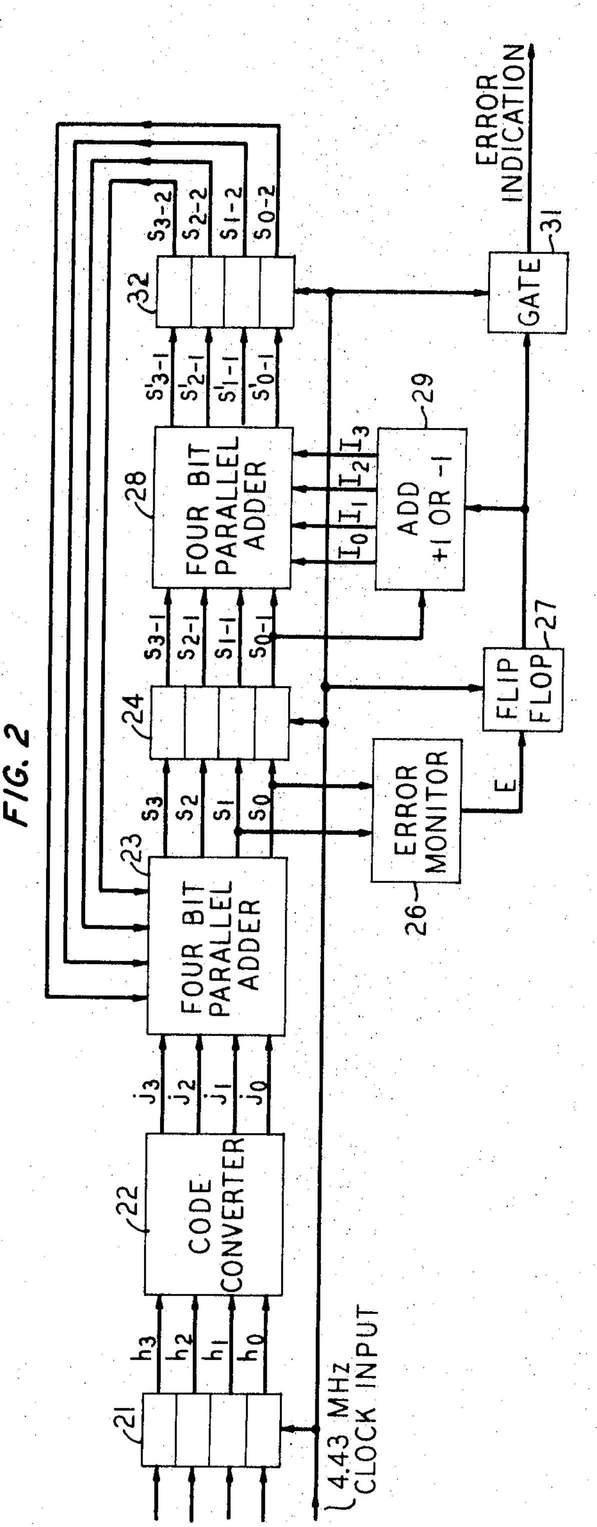
FIG. 2 is a block diagram of an illustrative embodiment of the invention.

FIG. 2 is a detailed block diagram of the error detector 16 of FIG. 1. The arrangement of FIG. 2 is as pointed out heretofore, designed to take advantage of certain of the unique constraints of the partial response-type correlation of the transmitted signal, as exemplified in equation (1) for $x$ equal to 2. The relationship expressed in equation (1) with $x$ equal to 2 typifies partial response-type correlation in which alternate digits are related to each other. It is not necessary that the relationship be between alternate digits, and the apparatus to be discussed hereinafter, while based upon $x$ equal to 2, is readily applicable to other digit relationships, i.e., other values of $x$.

In equation (1), where the digit $A_n$ is assigned positive integer values from 0 to 7, digit $B_n$ will have integer values from −7 to +7, and it is these 15 level pulses which are transmitted over the channel. It can be seen from equation (1), with $x$ equal to 2, that the transmitted pulse train can be regarded as two interleaved sequences of pulses, one sequence being the even-numbered $B_n$'s and the other the odd-numbered $B$'s. Each sequence may be represented by the summation $$S_n(J)=\sum_{j=0}^{J} B_{n+2j}=A_{n+2J}-A_{n-2} \qquad (2)$$

for all $n$ and $J$ where $J$ is the index indicator, and is greater than zero. For the 15 level system, the sum $S_n(J)$ satisfies the relation $7-A_{n12}\ S_n(J)\ -A_{n-2}$ (3) When an error occurs in transmission, the relationship (3) is violated, and error detector 16 makes use of the following algorithm:

If $S_n(J)>7-A_{n-2}$ (4)
Output: an error, and
add a −1 to the
existing sum
If $S_n(J)<-A_{n-2}$ (5)
Output: an error, and
add a +1 to the
existing sum In the arrangement of FIG. 2, the error detection circuit 16 comprises a first register 21 into which the binary output $h_0$—$h_3$ of converter 13 is fed under control of the "data ready" or clock pulse, shown in FIG. 2 as a 4.43 MHz. signal, generated in the converter 13. Register 21 may be, for example, four parallel flip-flops, each under control of the clock. In general, the binary code used in equipment such as is shown in FIG. 1 is not the most suitable for summing. To produce a more suitable code, the output of register 21 is applied to a code converter 22, where the $h_0$—$h_3$ coded word is changed to a $j_0$—$j_3$ binary code. FIG. 3 is a table of comparison of the two codes for the range of values of $B_n$. Obviously, where the code output of converter 13 is amenable to simple addition, converter 22 is not necessary, on the other hand, in most cases, converter 22 is found to be necessary to achieve the most desirable code for addition.

The output of converter 22, a four-bit parallel word $j_o$—$j_3$, is fed to a first four-bit parallel adder 23 where it is added to the proper running sum, i.e., either the running sum of the even-numbered digits or that of the odd-numbered digits. For simplicity in the following discussion, it will be assumed that the four-bit word being sent through the system is representative of an even-numbered digit.

The output of parallel adder 23 is fed to a second storage register 24 where it is stored until the occurrence of the next clock pulse. At the same time, the $S_1$ and $S_0$ output of the adder 23 are applied to an error monitor 26, which registers an output or error indication E when the running sum moves out of its allowed range. In determining the allowable range, it was found that no matter wherein the train of pulses ($b_n$) the summing was started, after startup the running sum would never exceed a total spread of eight digits for the fifteen digit transmitted pulses when $A_n$ has positive integral values only. This discovery makes it possible to select a range for the running sum that simplifies implementation of the error monitor. In FIG. 4 there is shown a chart for values of the running sum and corresponding values of the digits $s_0$—$s_3$. For an allowed range of $S_n$ of +3 to −4, digits $s_0$ and $s_1$ are alike, but outside of the range they are different. As a consequence, error monitor 26 can simply be an "exclusive OR" gate, producing an output E only when $s_0$ and $s_1$ are different, which only occurs when the allowable range is exceeded. The allowable range can be different from that shown in FIG. 4, but in that event the implementation of monitor 26 becomes more difficult. When error monitor 26 detects an error, it produces an output which is stored in flip-flop 27.

Upon occurrence of the next clock pulse, the word stored in register 24, now delayed by one clock period, as indicated by $s_{011}s_{311}$, is applied to a second parallel adder 28. At the same time, flip-flop 27 is triggered by the clock and produces an output to a correction signal generator circuit 29 when an error signal has been stored. Digit $s_{011}$ of the output of register 24 is also fed to circuit 29 to provide an indication of the direction in which the running sum must be corrected. The output of circuit 29, digits $I_0$, $I_1$, $I_2$, and $I_3$ are fed to adder 28 to correct the running sum when there has been an error. In FIG. 5 there is shown a truth table which indicates the values of $I_0$ through $I_3$ for different conditions of $s_{011}$ and E. It can be seen in FIG. 5 that if there is an error signal and if the $s_{011}$ bit is zero, a −1 is added to the running sum, since the error was in the positive going direction. If there is an error signal and the $s_{011}$ bit is a one, a +1 is added to the running sum since the error was in the negative going direction. The running sum is always modified by addition of +1 or −1, irrespective of the position of the sum in the error region.

At the same time that the running sum is being corrected, the output of flip-flop 27 is being passed through an error gate 31 under control of the clock, to provide an indication of error to associated equipment. In addition, although not shown, the value of $s_{011}$ may be monitored to give an indication of the type of malfunction creating the error. Thus a long string of errors in, for example, a positive-going direction might indicate particular faults in the system.

The output of adder 28, which is the corrected running sum of, for example, the even-numbered pulses, is applied to a storage register 32 at the same time that the running sum of the odd-numbered pulses is being applied to register 24, and the next even pulse word is being applied to register 21. Upon occurrence of the next clock pulse, the corrected even-numbered running sum in register 32 is fed back to adder 23, now delayed by two digits, at the same time that the next word in the even-numbered sequence is applied to adder 23. Simultaneously, the odd-numbered running sum is fed to adder 28 and the next odd-numbered pulse in the sequence is applied to register 21. Where the value of $x$ is greater than 2, more delay registers 32 are needed. Thus for $x$ equal to 4, two more such registers, under control of the clock, would be needed.

From the foregoing, it can be seen that the error detector circuit of the present invention maintains two independent running sums, correcting and updating them sequentially, while providing an output signal when an error occurs. The detector provides a direct measure of the performance of the digital transmission channel. Since the detector can discriminate between positive- and negative-going errors, it contains information of the same nature as that achieved through the use of a more complicated slicer centered about each of the received levels, hence it can function as a potential source of control information for a number of applications.

It is to be understood that the foregoing description of an embodiment of the invention is for purposes of illustrating the principles thereof. Numerous other embodiments of the principles of the invention may occur to workers skilled in the art without departure from the spirit and scope of the invention.

We claim:

1. In a pulse transmission system wherein pulses are transmitted in a partial response format characterized by multiple levels of pulse amplitude and a pulse correlation constraint of the form $$B_n = A_A -_{n1x}$$

where $B_n$ is the $n$th transmitted pulse, $A_n$ is the $n$th signal pulse prior to correlation and $A_{n1x}$ is the (n−x)th pulse prior to correlation where $x$ is an integer greater than one, means for monitoring the transmission for errors comprising means for sequentially maintaining a plurality of running sums of the different sets of related pulses defined by the constraint in the transmitted sequence, means for sequentially detecting violations of a code constraint in the running sums and for producing an output signal when a violation occurs, means responsive to the output signal for correcting the particular running sum in which the violation occurs, and means for delaying the running sum and feeding it back to said summing means in synchronism with the introduction of the next pulse of the set to be added to that particular running sum.

2. The transmission error monitoring system as claimed in claim 1 wherein the violation detecting means comprises means responsive to sums greater or less than the upper and lower limits respectively of a range of values less than the total range of the multiple pulse levels.

3. Apparatus for detecting errors in transmission of a multiple level pulse code of the partial response correlations type in which there are sets of related pulses comprising means for converting multilevel pulses to binary form, a first adder circuit connected to the converter output, and error monitor circuit connected to the output of said first adder for producing an output signal when the adder output exceeds a predetermined range of values, a pulse storage circuit to which the output of said monitor circuit is connected, an error correction signal generator circuit connected to the output of said pulse storage circuit, a second adder circuit into which the output of the first adder is fed after a delay and to which the output of the correction signal generator circuit is connected to produce a corrected sum at the output of said second adder, and means for feeding the output of said second adder back to said first adder in synchronism with the application of the binary word representative of the next pulse in the particular set of which the output of the adder represents the running sum.

4. Apparatus as defined in claim 3 and further including a storage circuit between said first and second adder circuits, one output of said storage circuit being connected to said correction signal generator to control the sign of the correction signal.

5. Apparatus as claimed in claim 3 wherein said error monitor circuit comprises an exclusive OR gate.

6. Apparatus for detecting errors in transmission of a multilevel pulse code of the partial response correlation type in which time spaced nonadjacent pulses are related to each other, thereby defining sets of related pulses, comprising means for converting multilevel transmitted pulses into binary word form and applying each word in parallel form to a first adder, means connected to the first and second digit leads of the parallel output of said adder, said means being responsive to a difference in signal on said output leads to produce an error signal, means for storing said error signal and signal storage means for storing the output of said first adder, a correction signal generator circuit connected to the output of the error signal storing means and to one lead of the parallel output of said signal storing means, means for causing said signal storage means to release the word stored therein to a second adder and for causing said error-signal-storing means to release its stored signal to said correction signal generator, the output of said correction signal generator being connected to said second adder whereby the sum in said adder is corrected, and means connected to the output of said second adder for storing the output thereof until the next related pulse of the set is introduced into said first adder, and feeding back the stored output to said first adder in synchronism with the related pulse.